July 11, 1944.  F. B. ADAM ET AL  2,353,121
WIRE DUCT
Filed July 29, 1942  3 Sheets-Sheet 1
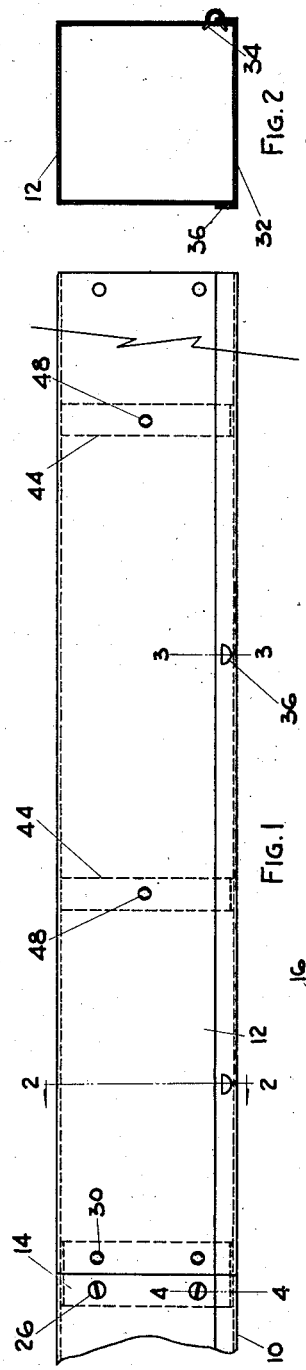
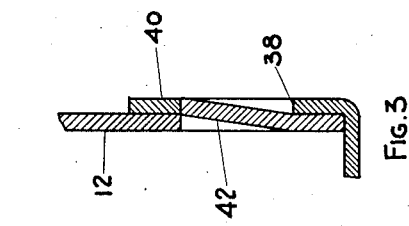
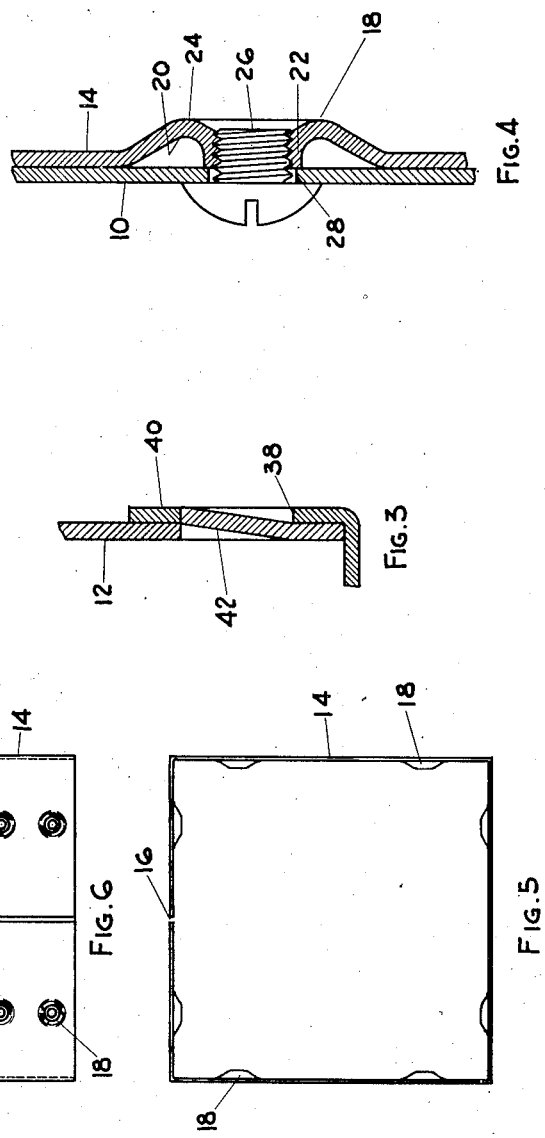
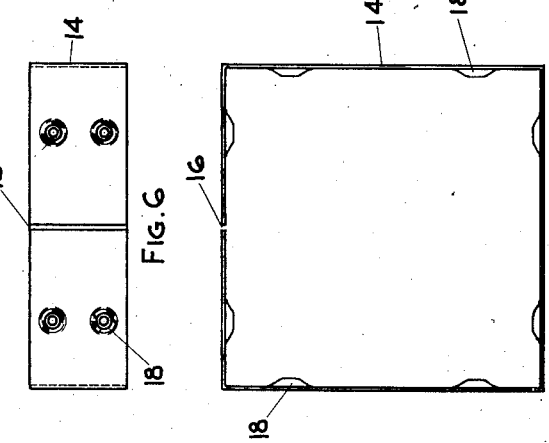
INVENTOR.
FREDERICK B. ADAM AND
HENRY M. STIEGLITZ
BY Dan A. Fischer -ATTY.

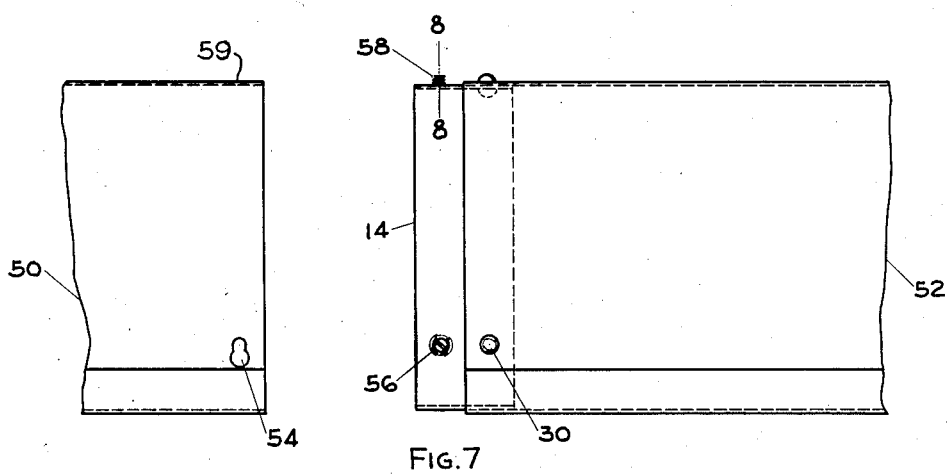
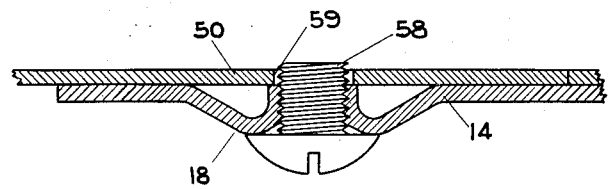
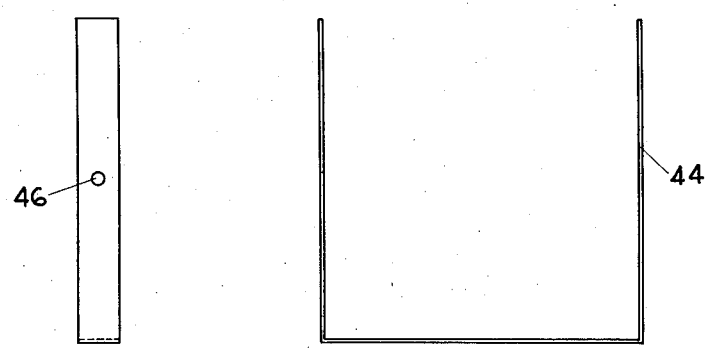

July 11, 1944. F. B. ADAM ET AL 2,353,121
WIRE DUCT
Filed July 29, 1942 3 Sheets-Sheet 3
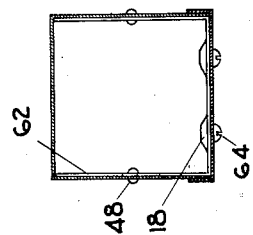
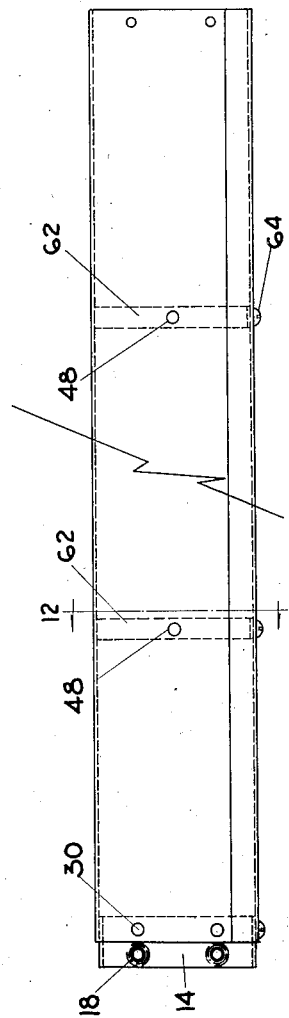
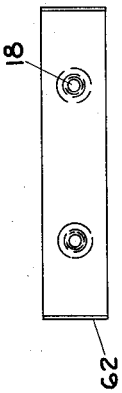
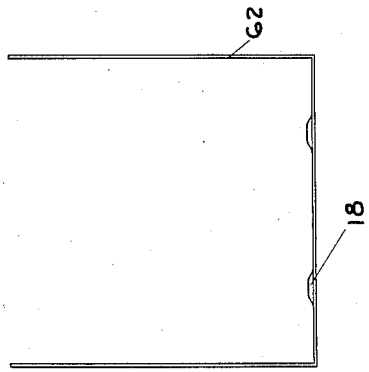
INVENTOR.
FREDERICK B. ADAM AND
HENRY M. STIEGLITZ
BY Don A. Fischer ATTY.

Patented July 11, 1944

2,353,121

UNITED STATES PATENT OFFICE 2,353,121

WIRE DUCT

Frederick B. Adam, St. Louis County, and Henry M. Stieglitz, St. Louis, Mo.

Application July 29, 1942, Serial No. 452,812

6 Claims. (Cl. 138—74)

This invention relates to improvements in wire ducts. It is an object of this invention to provide an improved wire duct and coupling therefor. The improvements provided by this invention make it possible to dispense with flanges on the outside of wire duct which are now used in order to provide a wire duct with a smooth inner surface.

An improved coupling is provided for this invention which makes it possible to use screws to secure the duct to the coupling and yet avoid damage to wires being pulled through the duct by the ends of the screws.

There is also shown an improved hinged cover, and catch which make possible a simple low cost design. An improved removable cover is also shown in another embodiment of the invention.

Further objects and advantages of the invention will become apparent from the following detailed description of the invention and from the accompanying drawings showing several embodiments thereof.

Referring now to the drawings:

Figure 1 is a side view of a section of the improved wire duct showing a coupling and a partial view of the adjoining duct section.

Figure 2 is a cross-sectional view of Fig. 1 along line 2—2.

Figure 3 is a section taken along line 3—3 of Fig. 1.

Figure 4 is an enlarged partial section taken along the lines 4—4 of Fig. 1.

Figure 5 is an end view of one of the couplings provided by the invention.

Figure 6 is a plan view of the coupling shown in Fig. 5.

Figure 7 is a side view of two adjacent sections of wire duct embodying other features of the invention in position for joining.

Figure 8 is a cross-sectional view taken along the line 8—8 of Fig. 7.

Figure 9 is an end view of one form of the wire support used in the wire duct.

Figure 10 is a side view of the support shown in Fig. 9.

Figure 11 is a side view of a section of wire duct with another form of cover.

Figure 12 is a cross-sectional view taken along line 12—12 of Fig. 11.

Figure 13 is an end view of one of the wire supports used in the construction shown in Fig. 11.

Figure 14 is a top view of the wire support shown in Fig. 13.

In the drawings the numerals 10 and 12 indicate two sections of duct which may be formed of metal or of other suitable material and may be U-shaped as shown. The coupling 11 is provided by this invention and is positioned as shown in Fig. 1 between the adjacent sections 10 and 12, so that a butt joint may be formed between the sections. The coupling 14 may be provided with smooth or rounded edges which allow wires to be drawn thereover without damaging the insulation. The coupling may be formed of a strip of the shape shown in Fig. 5. The joint 16 between the two ends of the coupling 14 may be positioned opposite the open side of the duct as shown. The coupling is provided with a specially formed and designed screw receiving formation 18. These formations may be symmetrically arranged around the coupling to facilitate the interchange of various fittings, duct sections and couplings. Various fittings such as T's, L's, etc., of wire duct may be provided to allow the wire duct to extend around corners, curves, etc.

A more detailed view of the formation is shown in Fig. 4 where it can be seen that a convex portion 20 is formed in the inside of the coupling. An internally threaded tubular portion 22 extends outwardly from the center of this convex portion and forms a screw receiving portion. The highest part 24 of the convex portion is rounded carefully so that any wires that are drawn thereover will not be injured. It should also be noted that the highest portion 24 is well above the top of the screw 26 so that the screw will not damage the wires in the duct. It should also be noted that the end of the internally threaded portion 28 is flush with or below the surface of the coupling 14, which makes it possible for the duct surface 10 to fit flatly against the surface of the coupling.

In the usual form of assembly a coupling may be secured by rivets 30 to one end of a section of wire duct, and the adjacent section 10, for instance, is then secured to the coupling by screws 26 drawn up tightly. The coupling not only secures the two adjacent sections of wire duct together but provides a wire support to prevent the wires from falling out of the duct when the hinged cover is lowered. By placing the joint of the coupling opposite the open side of the duct the duct effectually secures the opposed ends of the coupling against movement, while the solid end of the coupling serves to support wires in the duct. The hinged cover 32 may be provided with a hinge 34 at one side thereof and a snap catch 36 on the other side thereof. The snap catch is shown in detail in Fig. 3 where it can be seen that an opening 38 is provided in the flange 40 of the hinged cover. A lip 42 is cut and bent from the bottom edge of the duct side wall to engage the opening 38. The snap catch would not work however, if it were not designed to co-operate with the positioning of the coupling 14 and wire supports 44. The wire supports 44 are shown in detail in Fig. 9 and in Fig. 10, where it can be seen that the supports are provided with openings 46 which line up with corresponding openings in the ducts. Rivets 48 may be used to secure the wire supports to the duct as shown. These wire supports not only form supports for the wires to prevent them from dropping out of the duct, but also provide the support necessary on either side of the snap catch 36 to make it function properly. Applicant has found that by using No. 16 gauge material for the duct, the supports should be placed approximately two feet apart in order that the catch will function satisfactorily. This catch has the advantage that in shipment and handling it will not be knocked off of the duct as are the majority of catches now employed.

In Fig. 7 an optional form of assembly is shown. In this form of assembly it will be noted that the coupling 14 is joined in the usual manner as by rivets 30 to one of the sections of duct 52. The adjacent section of duct 50 is provided with a key-hole type of opening 54 which may be slipped over the head of screw 56 which may be staked. A screw or dowel 58 is permanently secured in the coupling, as is shown in Fig. 8, to co-operate with an opening 59 in the top of the duct section 50. To assemble the duct with this coupling arrangement the duct section 50 is slipped over the coupling so that the opening 59 will co-operate with the end of the screw 58 and so that the key-hole opening 54 can be placed over the head of the screw 56. The duct is then pushed down relative to the section 52 so that the narrow portion of the key-hole opening 54 slides under the head of screw 56 and the opening 59 fits over the end of screw 58 as is shown in the detail view Fig. 8. Such a construction is especially useful in the smaller ducts, particularly when they are to be mounted flat against the ceiling or wall.

In Figs. 11–14 is shown a different method of securing the cover to the wire duct. Using this method, a removable cover is secured to the coupling 14 and to wire support 62 by screws 64 which are screwed into the screw receiving formations of the coupling and of the wire supports. In this form of construction it will be noted that the wire supports are provided with screw receiving formations which are not necessary in the hinge and catch type of cover construction. Thus it can be seen that the coupling provided by this invention provides a smooth inside surface for the wire duct and prevents any contact of the wires with the rough edges of the screws or other fastening means. Such a construction makes it possible to dispense with the outside flange type of wire duct construction previously used. The outside flange construction made it impossible to place the wire duct flat against the wall or ceiling of a building. The internally threaded portion of the special formation on the wire coupling and on some of the wire supports provides ample threads for the screws so that they will not strip the threads or pull out of the coupling. The improved hinge and catch type of cover makes it possible to dispense with catches on the duct which are easily damaged in shipment or after installation in the plant.

The assembly shown in Fig. 8 is useful for small ducts and especially when they are placed against the walls or ceiling. This construction has the added advantage of being fool-proof in that the securing screws can not be lost and then replaced by screws that are too long and which would injure wires in the duct.

It is understood that various changes may be made in the embodiments shown without departing from the spirit and scope of the invention as defined by the appended claims.

What we claim is:

1. A wire duct comprising adjacent sections joined end to end by a coupling, said coupling being secured to one of said sections and provided with a plurality of special formations, said formations being convex on the inside of the coupling and provided with an internally threaded tubular portion extending outwardly from the center of the convex portion, openings in the other duct section registering with the internally threaded tubular portion and screws extending through the openings in the duct and into the internally threaded tubular member to secure the duct section to the coupling.

2. A wire duct comprising two adjacent duct sections joined end to end by a coupling on the inside of said joint, said coupling comprising a strip conforming to the shape of the duct and provided with a plurality of screw receiving formations, said screw receiving formations being formed convex on the inside of the coupling and provided with tubular internally threaded portions extending outwardly from the center of the convex portions, the outer end of the internally threaded portions being arranged to allow the duct section to be placed in flat contact with the surface of the coupling, openings in the duct registering with the screw receiving formations and screws extending through the duct and into the screws receiving formations.

3. A wire duct comprising adjacent duct sections placed end to end, each duct section being of U-shape with an open side, a coupling permanently secured to an end of one of the duct sections, wire supports intermediate the ends of the duct sections, a hinged cover on the open side of the ducts, said hinged cover being provided with hinges along one side thereof, and a flange along the other side thereof, openings in said flange, lips projecting from the bottom edge of one of the duct sides arranged to engage the openings in the flange to form an operable snap catch to maintain the cover in closed position, the openings in the flange and the co-operating lips being positioned intermediate the wire supports, said wire supports providing the duct sides with sufficient rigidity to permit the openings in the flange and the lips in the duct side to function as an operable snap catch.

4. A wire duct comprising adjacent duct sections positioned end to end and joined by means of a coupling, wire supports placed intermediate the ends of each duct section, said duct sections being U-shaped, a cover for the open side therefor, the couplings and the wire supports extending across the open side of the duct section and provided with screw receiving formations therein, said screw receiving formations being convex on the inside of the coupling and the wire supports and provided with a tubular internally threaded portion extending outwardly from the center of the convex portion, openings in the duct cover registering with the screw receiving formations and screws extending through the duct cover and into the screw receiving portions to secure the cover to the duct.

5. A wire duct comprising adjacent duct sections placed end to end to form a butt joint, a coupling beneath and extending around the inside of said joint, the coupling being secured to one of the duct sections, a staked screw secured in the exposed end of the coupling, a key-hole shaped opening in the other duct section adapted to fit over the head of said screw, a dowel permanently secured in and extending outwardly from the upper side of the coupling, an opening in the adjoining duct section adapted to engage said dowel, engagement between the coupling and co-operating duct section being first made by placing the opening over the dowel pin and the large portion of the keyhole opening over the staked screw head, final engagement being secured by pushing the duct section down until the narrow portion of the keyhole opening engages the staked screw and tightening said screw.

6. A coupling adapted to join two adjacent sections of a wire duct comprising a strip of material conforming to the shape of the wire duct, rounded edges on said strip, specially formed screw receiving formations in said strip, said formations being convex on the inside of the coupling and provided with an internally tubular threaded portion projecting outwardly from the center of the convex portion, said internally threaded tubular portion not extending above the surface of the outside of the coupling, the inside of the coupling presenting a smooth and uniform surface and the convex portion being gently curved and arranged to extend beyond a screw when inserted in the internally threaded tubular portion, said coupling being adapted to be secured to an end of one of the duct sections and to have screws inserted through the other duct section and into the screw receiving formations, said coupling being adapted to support wires in the wire duct.

FREDERICK B. ADAM.
HENRY M. STIEGLITZ.